United States Patent
Onouchi et al.

(10) Patent No.: US 11,029,423 B2
(45) Date of Patent: Jun. 8, 2021

(54) RADIATION IMAGING SYSTEM

(71) Applicant: Hitachi, Ltd., Tokyo (JP)

(72) Inventors: Masafumi Onouchi, Tokyo (JP); Takafumi Ishitsu, Tokyo (JP); Fumito Watanabe, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 16/808,774

(22) Filed: Mar. 4, 2020

(65) Prior Publication Data

US 2020/0408939 A1 Dec. 31, 2020

(30) Foreign Application Priority Data

Jun. 28, 2019 (JP) .............................. JP2019-120659

(51) Int. Cl.
 *G01T 1/24* (2006.01)

(52) U.S. Cl.
 CPC .............. *G01T 1/241* (2013.01); *G01T 1/244* (2013.01)

(58) Field of Classification Search
 CPC ......... G01T 1/241; G01T 1/244; G01T 1/243; G01T 1/1614; G01T 1/172; G01T 1/2023; G01T 1/208
 See application file for complete search history.

(56) References Cited

U.S. PATENT DOCUMENTS

| | | | |
|---|---|---|---|
| 7,297,955 B2* | 11/2007 | Amemiya | G01T 1/2928 250/363.04 |
| 2007/0121781 A1 | 5/2007 | Meirav et al. | |
| 2015/0319830 A1* | 11/2015 | Lacey | A61B 6/035 378/19 |

FOREIGN PATENT DOCUMENTS

JP 2007-144184 A 6/2007

* cited by examiner

*Primary Examiner* — David P Porta
*Assistant Examiner* — Fani Boosalis
(74) *Attorney, Agent, or Firm* — Baker Botts L.L.P.

(57) ABSTRACT

To provide a radiation imaging system which is adapted to downsize a photon counting radiation detector including a semiconductor layer for detecting photons of radiation and a collimator for suppressing incidence of scattered rays, and which ensures high voltage resistance. The radiation imaging system includes: a radiation source; a radiation detector; and a support portion for supporting the radiation source and the radiation detector in opposed relation. The system has a structure wherein the radiation detector includes a plurality of detecting element modules arranged in an arcuate form. The detecting element module includes a base fixed to the support portion; a semiconductor layer; a high-voltage wire for supplying high voltage to the semiconductor layer; a collimator for suppressing scattered rays, and a supporting column disposed at place within a predetermined distance from the semiconductor layer.

11 Claims, 11 Drawing Sheets

RADIATION IMAGING SYSTEM

CLAIM OF PRIORITY

The present application claims priority from Japanese Patent Application JP 2019-120659 filed on Jun. 28, 2019, the content of which are hereby incorporated by references into this application.

BACKGROUND OF THE INVENTION

The present invention relates to a radiation imaging system equipped with a photon counting detector and to a structure supporting a collimator for scattered ray removal.

BACKGROUND ART

More recently, various institutions have been developing photon counting CT (Computed Tomography) systems equipped with a detector (photon counting detector) adopting a photon counting method. Unlike a charge integrator-type detector employed by conventional CT systems, the photon counting detector is capable of counting individual photons of the radiation incident on a semiconductor layer as a detecting element. Hence, the photon counting detector can measure energy of each of the photons. Accordingly, the photon counting CT system can obtain more information than the conventional CT system.

In the radiation imaging system typified by the CT system, a collimator defined by a slit or grid formed of a heavy metal plate such as of tungsten, molybdenum or tantalum is disposed between an object and the detector in order to suppress the incidence of scattered rays from the object. However, in a case where positioning accuracy between the collimator and the detecting element of the detector is insufficient, tomographic images generated by the CT system sustain the occurrence of virtual image called artifact.

According to Japanese Unexamined Patent Application Publication No. 2007-144184, a plurality of detector modules are mounted to a pair of collimator rails supporting all the collimator plates while a high voltage strip fixed to one of the collimator rails supplies high voltage to each of the plural detector modules via a high-voltage wire or the like.

SUMMARY OF THE INVENTION

However, a structure disclosed in Japanese Unexamined Patent Application Publication No. 2007-144184 may sometimes suffer difficulty in downsizing the detector modules including the collimators. Specifically, if a distance between the collimator rails supporting all the collimator plates is reduced in order to downsize the detector modules, a distance between the high-voltage strip and the detector modules is also reduced so that the modules may sometimes fail to ensure high voltage resistance.

Accordingly, it is an object of the present invention to provide a radiation imaging system which is adapted to downsize the photon counting radiation detector including the semiconductor layer for detecting the photons of the radiation and the collimator for suppressing the incidence of scattered rays and to ensure the high voltage resistance.

According to an aspect of the present invention for achieving the above objects, a radiation imaging system includes: a radiation source for radiation emission; a radiation detector for detecting photons of the radiation; and a support portion for supporting the radiation source and the radiation detector in opposed relation, and has a structure wherein the radiation detector includes a plurality of detecting element modules arranged in an arcuate form, the detecting element module includes: a base fixed to the support portion; a semiconductor layer receiving the photons to output an electric charge; a high-voltage wire for supplying high voltage to the semiconductor layer; a collimator for suppressing scattered rays incident on the semiconductor layer; and a pair of supporting columns supporting the collimator and fixed to the base, and the supporting column is disposed at place within a predetermined distance from the semiconductor layer and includes a cutout portion in which the high-voltage wire is inserted.

The present invention provides the radiation imaging system which is adapted to downsize the photon counting radiation detector including the semiconductor layer for detecting the photons of the radiation and the collimator for suppressing the incidence of scattered rays, and ensures high voltage resistance.

DETAILED DESCRIPTION OF THE PREFERRED EMBODIMENTS

The embodiments of the present invention will hereinbelow be described with reference to the accompanying drawings. It is noted that a radiation imaging system of the present invention is applicable to a system including a radiation source and a radiation detector for detecting photons of the radiation. The following description is made on an example in which the radiation is X-rays, the radiation detector is a photon counting X-ray detector, and the radiation imaging system is an X-ray CT system.

First Embodiment

Figure 1:
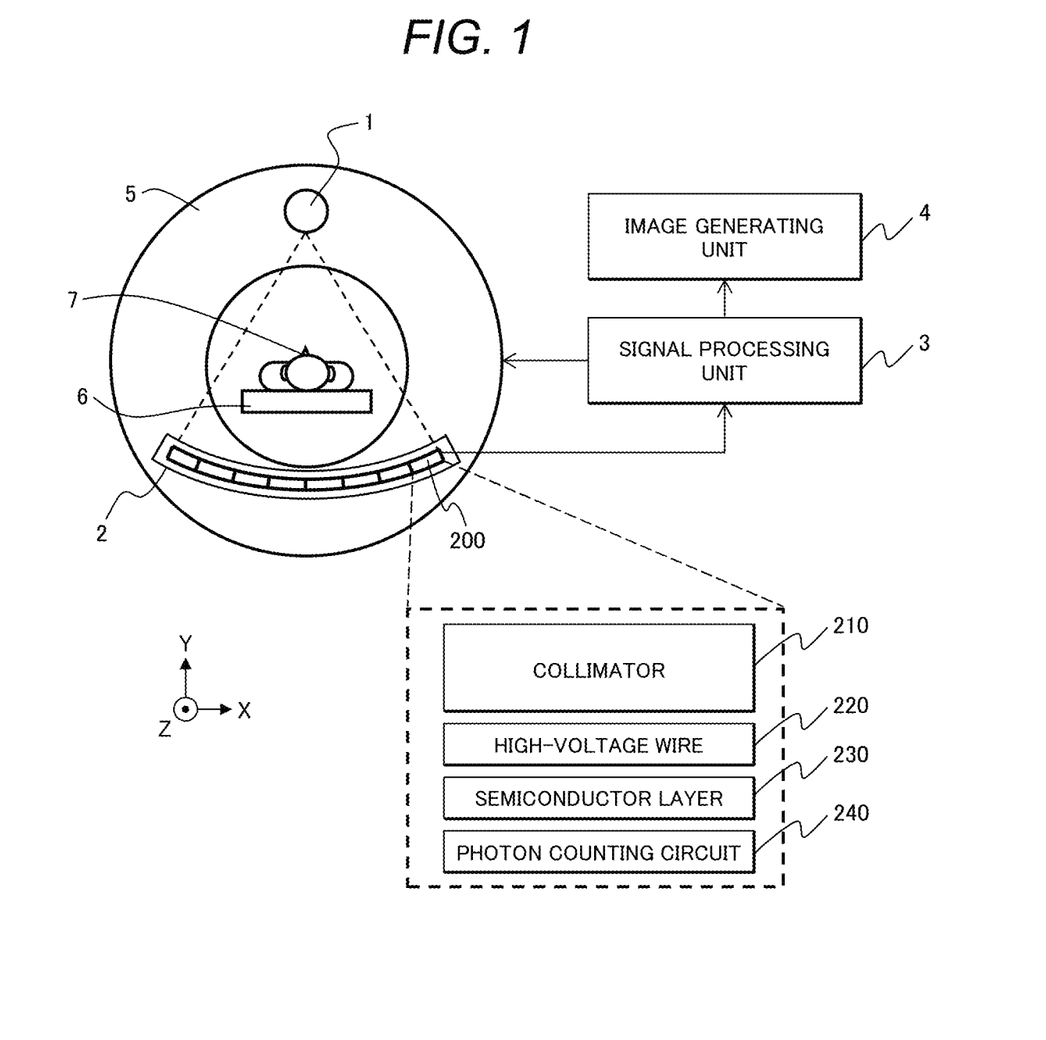
FIG. 1 is a diagram showing an overall structure of an X-ray CT system to which the present invention is applied.

As shown in FIG. 1, the X-ray CT system of the embodiment includes an X-ray source 1 for X-ray irradiation, an X-ray detector 2 including a two-dimensional array of plural detecting elements for X-ray detection, a signal processing unit 3, and an image generating unit 4. The signal processing unit 3 performs a correction and the like of a detection signal from the detecting element and also controls the individual parts of the X-ray CT system. The image generating unit 4 generates an image of an object 7 using the signal subjected to the correction and the like by the signal processing unit 3. The X-ray source 1 and the X-ray detector 2 are carried on a rotary plate 5 as located in an opposed relation. The X-ray source and the X-ray detector are configured to rotate around the object 7 lying on a bed 6 and relative to the object 7. Incidentally, a combination including the X-ray source 1, the X-ray detector 2 and the rotary plate 5 is also referred to as a scanner.

The X-ray detector 2 includes a plurality of detecting element modules 200 arranged in an arcuate form centered at the X-ray source 1. The detecting element module 200 is a photon counting detector including a collimator 210, a high-voltage wire 220, a semiconductor layer 230, and a photon counting circuit 240. The semiconductor layer 230 is formed of, for example, cadmium zinc telluride (CZT), cadmium telluride (CdTe) or the like and generates an electric charge equivalent to the photons of an incident X-ray. The photon counting circuit 240 counts the electric charges generated by the semiconductor layer 230 and outputs the counting result as a count signal. The collimator 210 is formed of a heavy metal such as molybdenum and tantalum in the form of slit or grid to suppress the incidence of scattered rays onto the semiconductor layer 230. The high-voltage wire 220 supplies high voltage to the semiconductor layer 230 in order to transfer the electric charges generated by the semiconductor layer 230 to the photon counting circuit 240. A detailed structure of the detecting element module 200 will be described hereinafter with reference to FIG. 2A to FIG. 6.

While the X-ray source 1 and the X-ray detector 2 arranged in the opposed relation rotate about the object 7, the irradiation of the X-rays from the X-ray source 1 and the detection of the X-rays through the object 7 by the X-ray detector 2 are repeated. The count signal outputted from the photon counting circuit 240 of the X-ray detector 2 is subjected to the processing such as correction by the signal processing unit 3 and then, transmitted to the image generating unit 4. Tomographic images of the object (CT images) 7 are generated by the image generating unit 4.

Figure 2A:
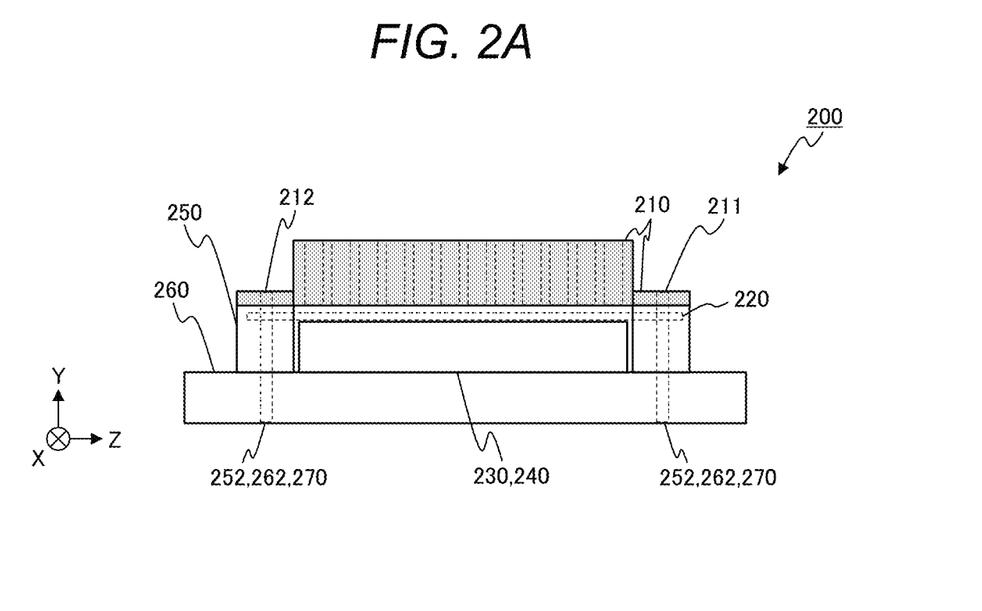
FIG. 2A is a side view of a detecting element module according to a first embodiment hereof.
Figure 2B:
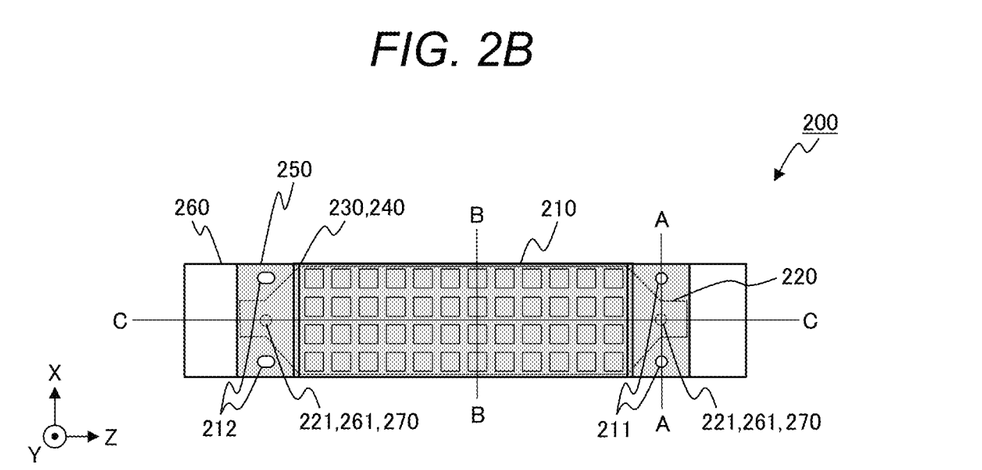
FIG. 2B is a top view of the detecting element module according to the first embodiment hereof.
Figure 3:
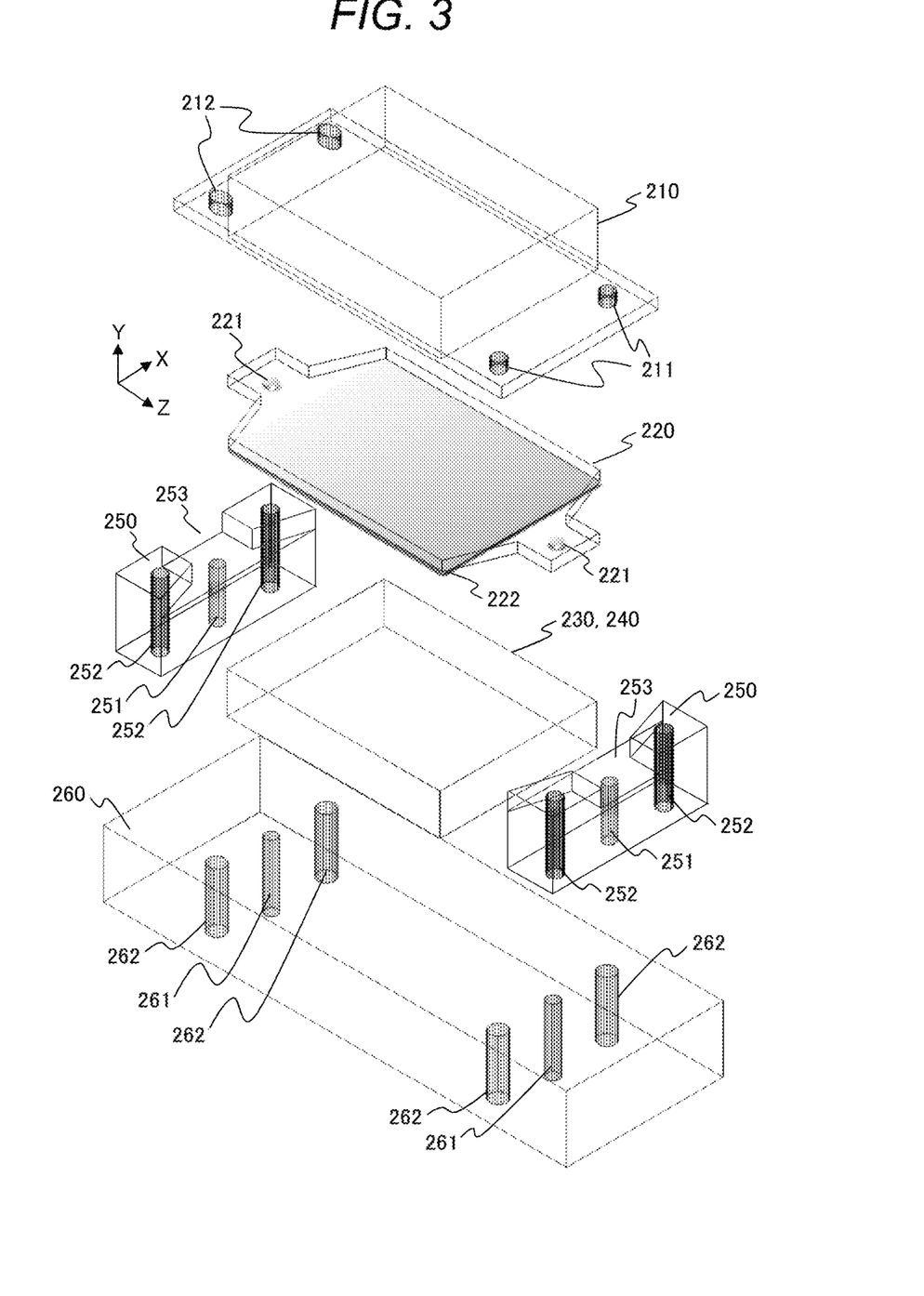
FIG. 3 is a perspective view showing individual parts constituting the detecting element module according to the first embodiment hereof.
Figure 4:
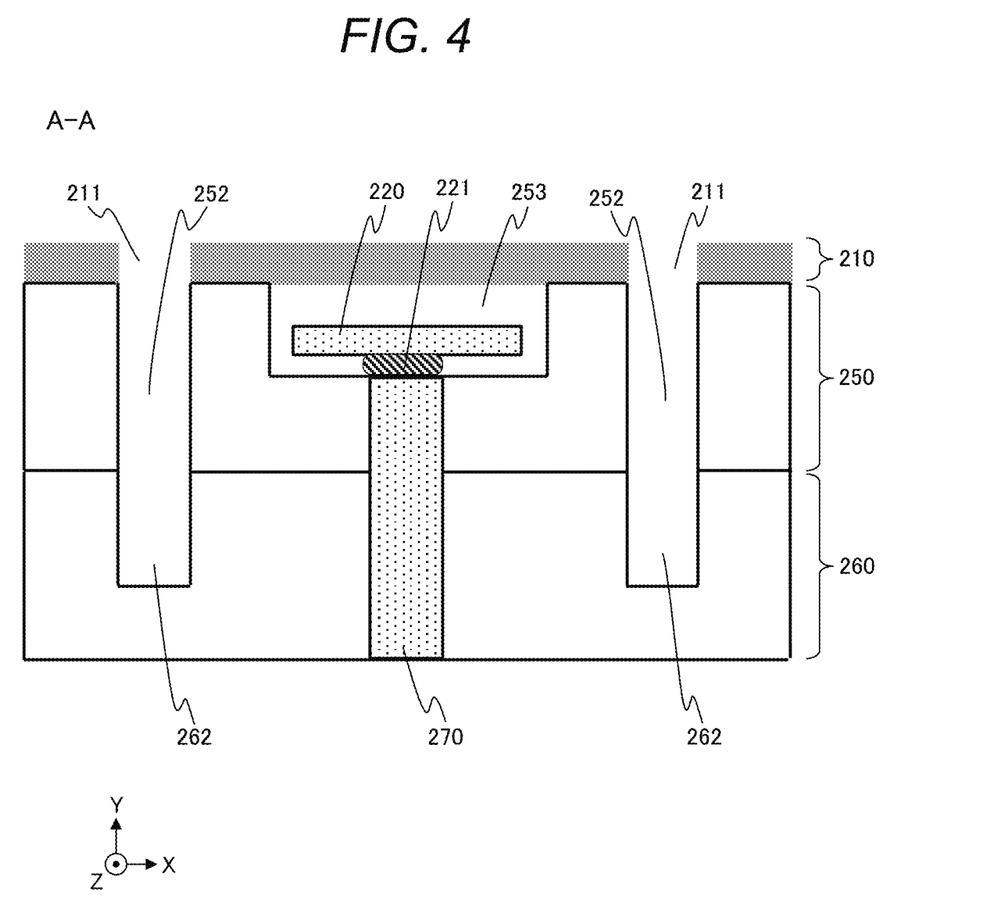
FIG. 4 is a sectional view of the detecting element module according to the first embodiment hereof, as taken on the line A-A in FIG. 2B.
Figure 5:
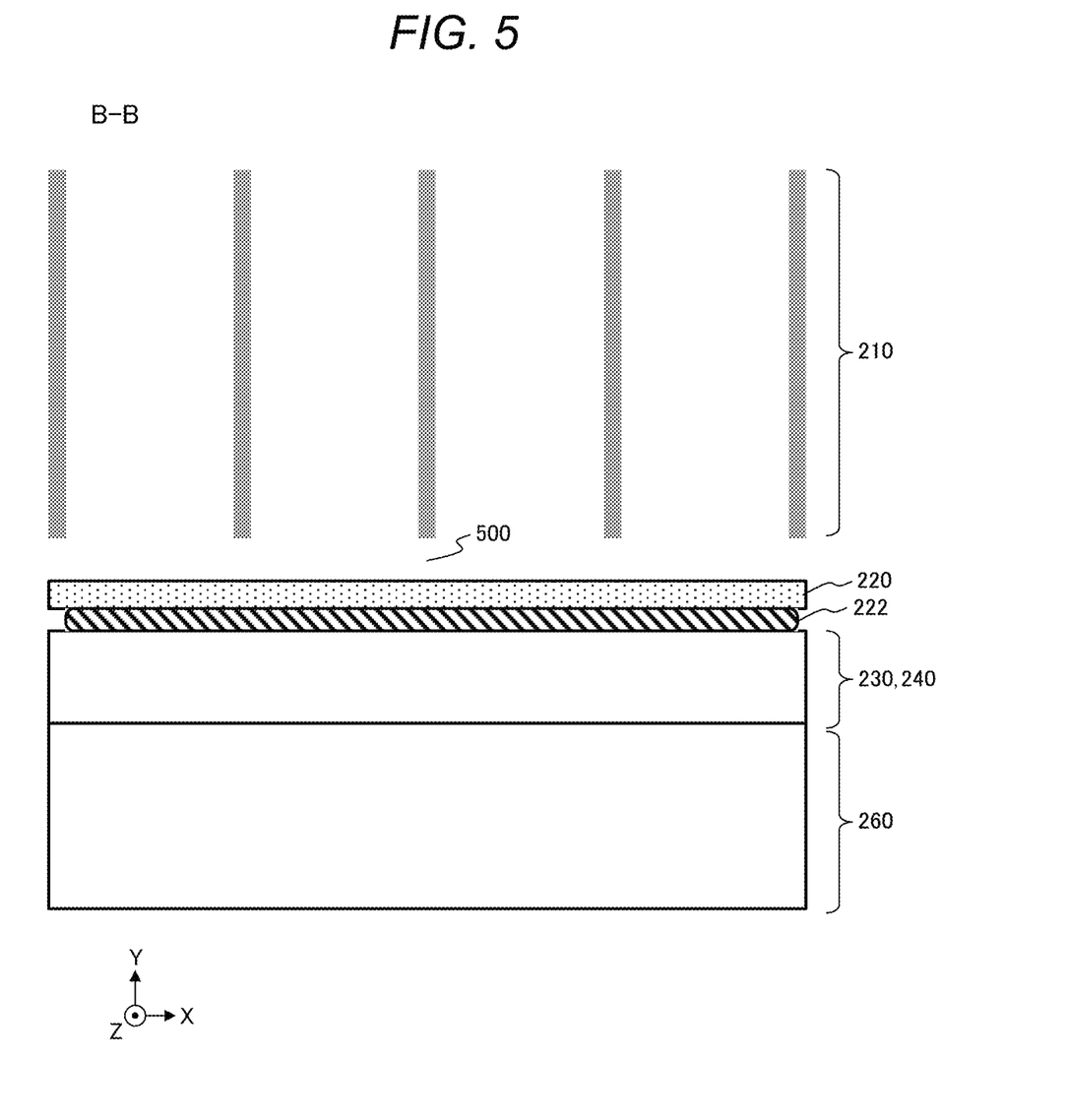
FIG. 5 is a sectional view of the detecting element module according to the first embodiment hereof, as taken on the line B-B in FIG. 2B.
Figure 6:
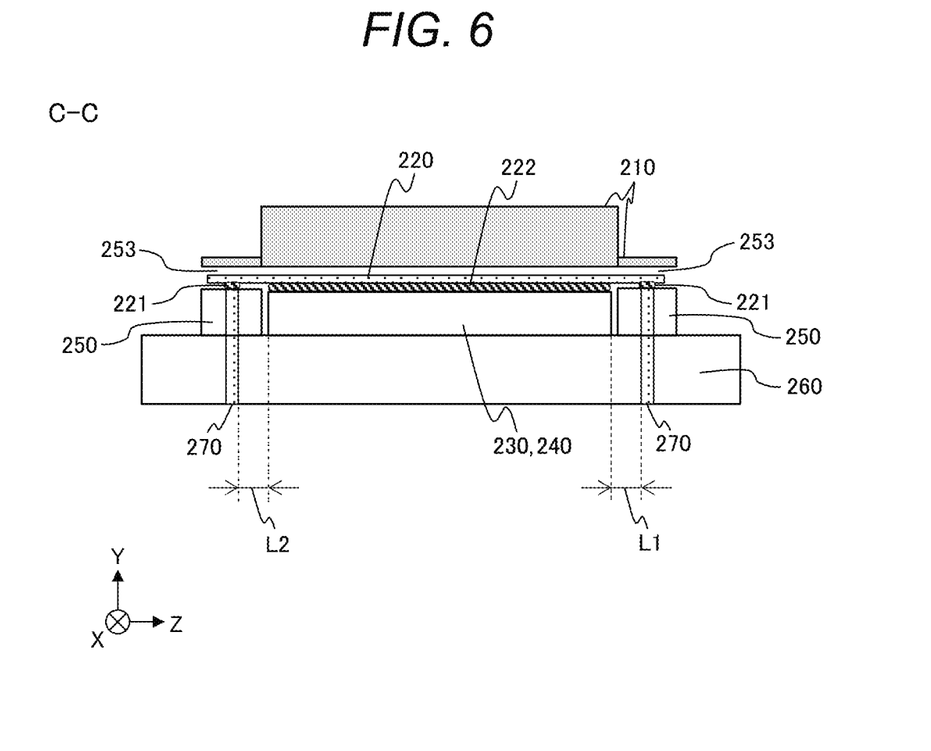
FIG. 6 is a sectional view of the detecting element module according to the first embodiment hereof, as taken on the line C-C in FIG. 2B.

The detailed structure of the detecting element module 200 is described with reference to FIG. 2A to FIG. 6. FIG. 2A is a side view of the detecting element module 200 while FIG. 2B is a top view of the detecting element module 200. FIG. 3 is a perspective view showing individual parts constituting the detecting element module 200. FIG. 4, FIG. 5 and FIG. 6 are sectional views taken on the line A-A, the line B-B and the line C-C in FIG. 2B, respectively. In the figures, the X-axis represents a rotational direction of the X-ray detector 2, the Y-axis represents an X-ray incidence direction, and the Z-axis represents a direction of the rotational axis of the X-ray detector 2. The detecting element module 200 includes a supporting column 250 and a base 260 along with the collimator 210, the high-voltage wire 220, the semiconductor layer 230, and the photon counting circuit 240.

The base 260 is fixed to the rotary plate 5 as a support portion for supporting the X-ray source 1 and serves as a reference for the position of the detecting element module 200. The base 260 is formed of aluminum, for example and includes a wire hole 261 and a mounting hole 262. At the center with respect to the Z-direction of the base 260, the photon counting circuit 240 and the semiconductor layer 230 are layered in the Y-direction. A pair of supporting columns 250 is disposed on the base 260 at places within a predetermined distance from the semiconductor layer 230 in the Z-direction. The distance from the semiconductor layer 230 to the supporting column 250 is defined according to the dimension of the detecting element module 200 with respect to the Z-direction.

In order to supply the high voltage to the semiconductor layer 230, the high-voltage wire 220 is laid on an X-ray incidence surface of the semiconductor layer 230, namely on a surface on the side of the X-ray source 1. The high-voltage wire is formed of, for example, a flexible cable. A sheet-like conductor 222 is disposed between the high-voltage wire 220 and the semiconductor layer 230 so as to electrically connect these elements. A connection conductor 221 is disposed at opposite ends of the high-voltage wire 220 in the Z-direction so that a current of several milliamperes is supplied to the high-voltage wire 220 via the connection conductor 221. In order not to interfere with the flow of current supplied to the high-voltage wire 220, the high-voltage wire 220 may desirably be configured to be progressively increased in the width in the X-direction from the connection conductor 221 to the sheet-like conductor 222, as shown in FIG. 3.

The supporting column 250 is formed of a metal having high X-ray shielding effect such as copper, iron, brass and tungsten, and supports the collimator 210. The support includes a wire hole 251, a mounting hole 252, and a cutout portion 253. In a case where a metal is used for forming the supporting column 250, electric insulation between the supporting column 250 and the high-voltage wire 220 is ensured by a coating material and the like of the high-voltage wire 220. To fix the collimator 210 at place, mounting holes 211 and mounting holes 212 disposed at opposite ends of the collimator 210 in the Z-direction are used in combination with mounting holes 252 in the supporting column 250 and mounting holes 262 in the base 260. The mounting holes 211 may be formed as a round hole and the mounting holes 212 may be formed as an elongate hole to provide a positioning margin for fixing position of the collimator 210 with respect to the Z-direction. Further, it is preferred that the mounting hole 211 and the mounting hole 212 are each formed at plural places so as to inhibit the deviation of the fixing positions of the collimator 210. Furthermore, a shorter distance between the mounting holes 211 and the mounting holes 212 is more preferred in the light of further increasing the fixing strength of the collimator 210.

The cutout portion 253 is formed at the center of the supporting column 250 with respect to the X-direction and at such a place as not overlaps with the mounting holes 211 or the mounting holes 212. The high-voltage wire 220 is inserted in the cutout portion 253. The cutout portions 253 may preferably be configured to conform with the opposite ends of the high-voltage wire 220 with respect to the Z-direction. At the cutout portion 253, the wire hole 251 of the supporting column 250 communicates with the wire hole 261 of the base 260. A high-voltage supply portion 270 is inserted through the wire hole 251 and the wire hole 261 as shown in FIG. 4 and FIG. 6. The high-voltage supply portion 270 supplies the high voltage to the high-voltage wire 220 via the connection conductor 221. Distance L1, L2 between the semiconductor layer 230 and the high-voltage supply portion 270 shown in FIG. 6 are so defined as to obviate the occurrence of electric discharge between an electrode on the side of the photon counting circuit 240 of the semiconductor layer 23 and the high-voltage supply portion 270.

It is desirable to retain the high-voltage wire 220 substantially in horizontal position so as to reduce tension applied to the semiconductor layer 230 by the high-voltage wire 220. It is therefore the most desirable that a height from the base 260 to a bottom of the cutout portion 253 is equal to a height from the base 260 to the X-ray incidence surface of the semiconductor layer 230, as shown in FIG. 2A and FIG. 6. The high-voltage wire 220 need not necessarily be horizontally laid because the tension applied to the semiconductor layer 230 by the high-voltage wire 220 may be reduced at least to a degree to prevent the breakage of the semiconductor layer 230. That is, the height of the bottom of the cutout portion 253 may be defined on the basis of the sizes of the semiconductor layer 230 and the photon counting circuit 240, the strength which the semiconductor layer 230 can withstand before breakage, and the tension applied by the high-voltage wire 220, so as to avoid the breakage of the semiconductor layer 230.

The height of the supporting column 250 is so defined as to provide an airspace 500 between the collimator 210 and the high-voltage wire 220, as shown in FIG. 5. The provision of the airspace 500 can keep the collimator 210 made of the heavy metal and the high-voltage wire 220 out of contact. Hence, the breakage of the semiconductor layer can be obviated.

According to the embodiment described with reference to FIG. 2A to FIG. 6, the supporting columns 250 for supporting the collimator 210 are disposed at places within a predetermined distance from the semiconductor layer 230 in order to accomplish the downsizing of the detecting element module 200. Further, the high-voltage supply portion 270 for supplying the high voltage to the high-voltage wire 220 connected to the semiconductor layer 230 is disposed at such a distance as to obviate the occurrence of electric discharge between the high-voltage supply portion 270 and the semiconductor layer 230. Therefore, the photon counting radiation detector including the semiconductor layer for detecting the photons of radiation and the collimator for suppressing the incidence of scattered rays can be downsized and can achieve the high voltage resistance.

In a case where the positioning accuracy between the collimator and the semiconductor layer is insufficient, the images generated by the radiation imaging system sustain the occurrence of virtual image called artifact. The following description is made on how the detecting element module 200 of the embodiment ensures the positioning accuracy between the collimator 210 and the semiconductor layer 230.

Figure 7A:
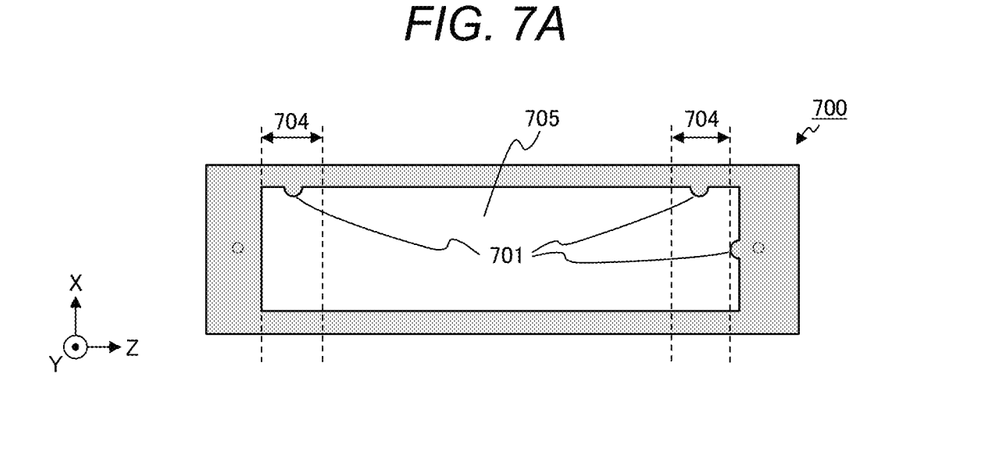
FIGS. 7A and 7B are diagrams showing an exemplary assembly jig for the detecting element module according to the first embodiment hereof.
Figure 7B:
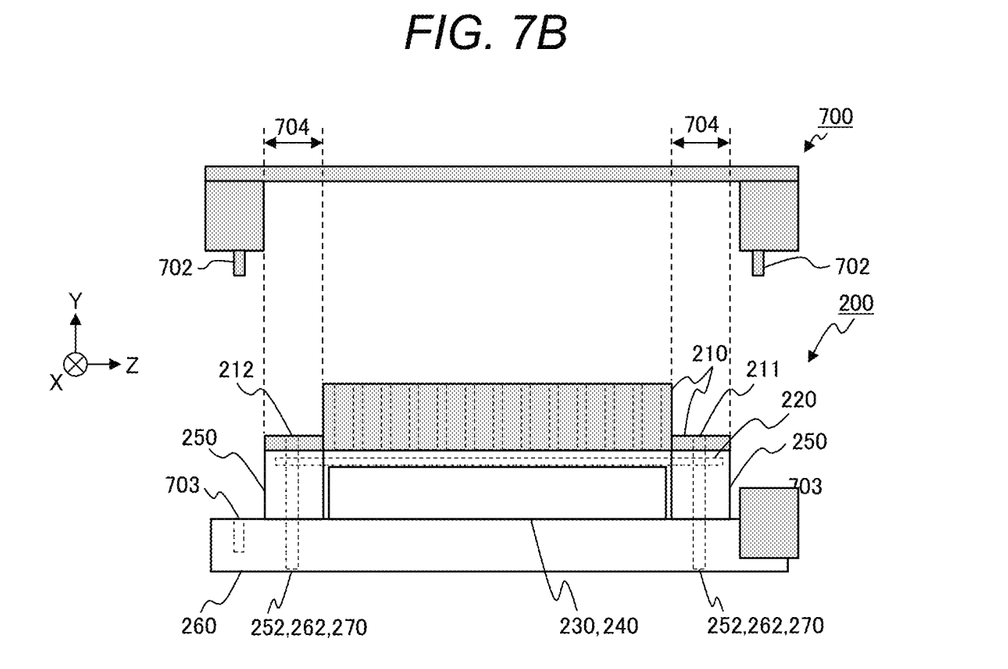

Referring to FIGS. 7A and 7B, description is made on an assembly jig 700 used for positioning the collimator 210 when the detecting element module 200 of the embodiment is assembled. FIG. 7A is a top view of the assembly jig 700 while FIG. 7B shows side views of the assembly jig 700 and the detecting element module 200.

The assembly jig 700 includes protrusions 701, pins 702, and an aperture 705. The pin 702 is connected to a fixing hole 703 used for fixing the base 260 to the rotary plate 5. The positioning accuracy with which the base 260 of the detecting element module 200 is fixed to the rotary plate 5 is also reproduced between the rotary plate 5 and the assembly jig 700 by connecting the pin 702 to the fixing hole 703.

In the X-Z plane, the aperture 705 is a rectangular opening larger than the collimator 210. One of the short sides of the inner periphery of the aperture 705 is formed with one protrusion 701 while one of the long sides is formed with two protrusions 701. Relative positions between the respective apexes of the three protrusions 701 and the pins 702 are so adjusted as to ensure the positioning accuracy between the base 260 and the collimator 210 when, with the pins 702 connected to the fixing holes 703, the collimator 210 is abutted against the three protrusions 701.

It is desirable that the protrusion 701 formed on the short side of the aperture 705 is located at the center of the aperture 705 with respect to the X-direction. The protrusions 701 formed on the long side of the aperture 705 are desirably located in a supporting-column adjoining range 704 as a range adjoining the supporting column 250. Because of the protrusions located in the supporting-column adjoining range 704, the assembly jig 700 is prevented from contacting the semiconductor layer 230 or the photon counting circuit 240 during an assembly work of the collimator 210. It is noted that the collimator 210 alone may be abutted against the protrusions 701 of the assembly jig 700 with the pins 702 connected to the fixing holes 703. Alternatively, the collimator 210 along with the supporting columns 250 may also be abutted against the protrusions of the assembly jig with the pins connected to the fixing holes.

The assembly jig 700 of the embodiment described with reference to FIGS. 7A and 7B permits the detecting element module 200 to be assembled while ensuring the positioning accuracy between the collimator 210 and the semiconductor layer 230.

Second Embodiment

In the first embodiment, the assembly jig 700 including the three protrusions 701 on the inner periphery of the aperture 705 larger than the collimator 210 is illustrated as a jig used for positioning of the collimator 210. In this embodiment, a jig simpler than the assembly jig 700 illustrated in FIGS. 7A and 7B and the like are described. Some of the components and functions described in the first embodiment are applicable to this embodiment. Hence, like reference numerals refer to the same or similar components or functions which are explained only once.

Figure 8A:
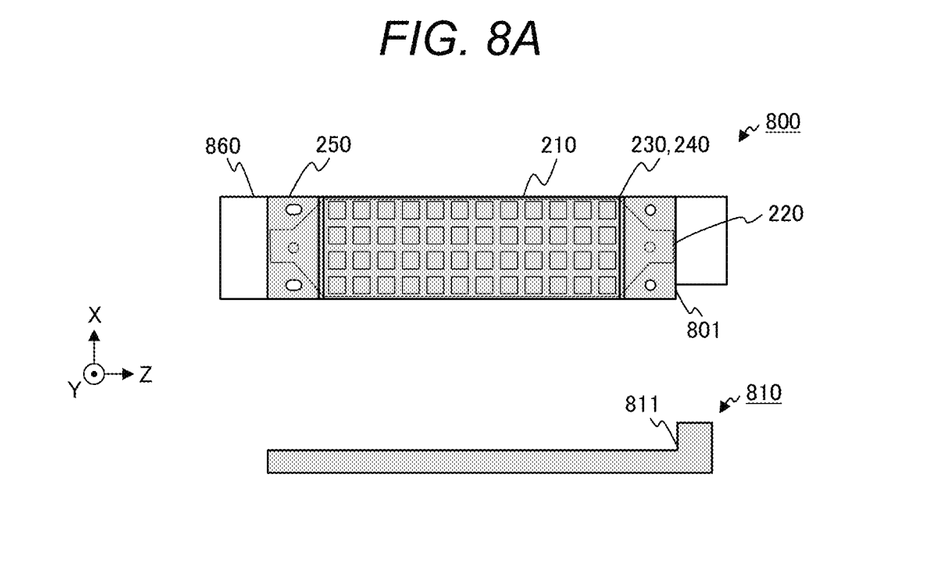
FIGS. 8A and 8B are diagrams showing a detecting element module according to a second embodiment hereof and an exemplary assembly jig therefor.
Figure 8B:
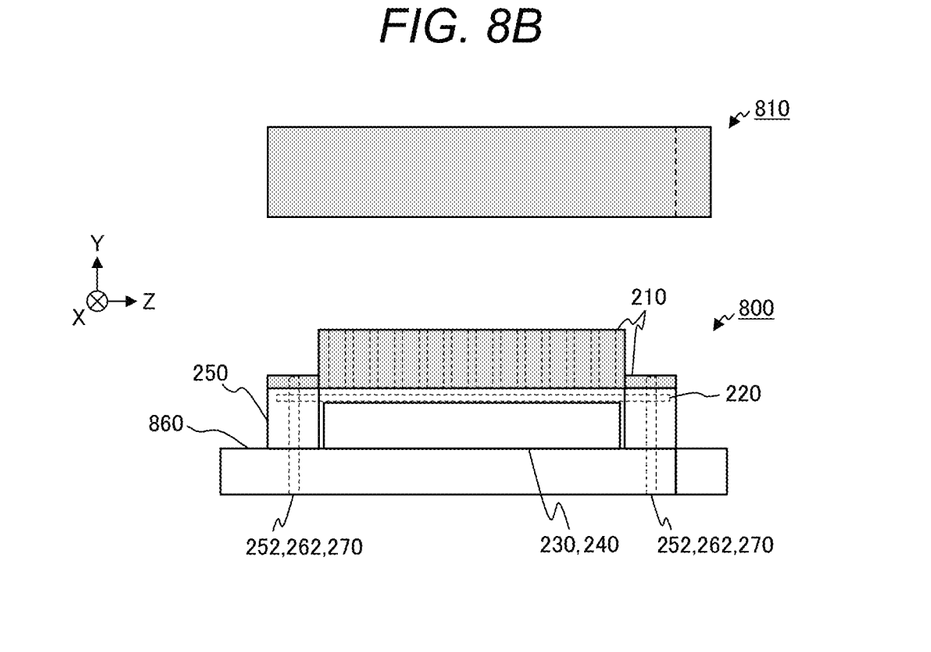

A detecting element module 800 and an assembly jig 810 according to the embodiment are described with reference to FIGS. 8A and 8B. FIG. 8A is a top view of the detecting element module 800 and the assembly jig 810. FIG. 8B is a side view of the assembly jig 810 and the detecting element module 800. In the figures, the X-axis denotes the rotational direction of the X-ray detector 2, the Y-axis denotes the X-ray incidence direction, and the Z-axis denotes the direction of the rotational axis of the X-ray detector 2.

As shown in FIG. 8A, the assembly jig 810 has an L-shaped cross-section and includes an abutment portion 811. A base 860 of the detecting element module 800, the collimator 210 of which is positioned by using the assembly jig 810, includes an abutment end-face 801 against which the abutment portion 811 is abutted. An end of the collimator 210 along with the abutment end-face 801 of the base 860 are abutted against the abutment portion 811 of the assembly jig 810.

The assembly jig 810 of the embodiment ensures positioning accuracy between the base 860 and the collimator 210 because the abutment end-face 801 of the base 860 along with an end of the collimator 210 are abutted against the abutment portion 811. Further, the assembly jig 810 of the embodiment has a simpler configuration than the assembly jig 700 of the first embodiment.

FIG. 8A shows the base 860 formed with the abutment end-face 801 such that the assembly jig 810 may be brought into abutment against the abutment end-face from a lower side of the drawing surface. However, the base 860 may also be formed with such an abutment end-face such that the assembly jig 810 may be brought into abutment from an upper side of the drawing surface. The base 860 along with only the collimator 210 may be abutted against the abutment portion 811 of the assembly jig 811. Alternatively, the base along with the collimator 210 and the supporting column 250 may be abutted against the abutment portion.

Third Embodiment

The first embodiment illustrates the case where the high-voltage supply portion 270 for supplying the high voltage to the high-voltage wire 220 is disposed in the supporting column 250. Depending upon a value of the voltage supplied to the high-voltage wire 220, however, the high-voltage supply portion 270 in the supporting column 250 may sometimes fail to prevent the electric discharge between itself and the electrode on the side of the photon counting circuit 240 of the semiconductor layer 230. In this connection, therefore, this embodiment illustrates a case where the high-voltage supply portion is disposed farther away from the semiconductor layer 230 with respect to the Z-direction than the supporting column which supports the collimator 210. Some of the components and functions described in the first embodiment are applicable to this embodiment. Hence, like reference numerals refer to the same or similar components or functions which are explained only once. In the following figures, the X-axis denotes a rotational direction of the X-ray detector 2, the Y-axis denotes an X-ray incidence direction, and the Z-axis denotes a direction of the rotational axis of the X-ray detector 2.

Figure 9A:
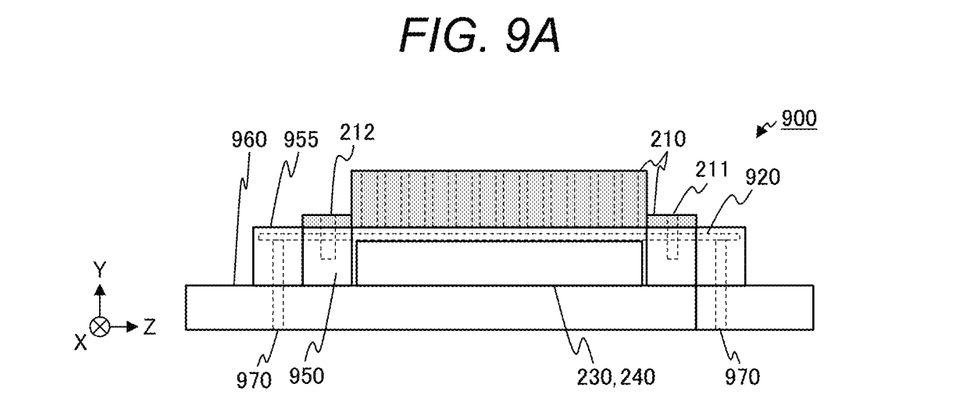
FIGS. 9A to 9C are diagrams showing a detecting element module according to a third embodiment hereof.
Figure 9B:
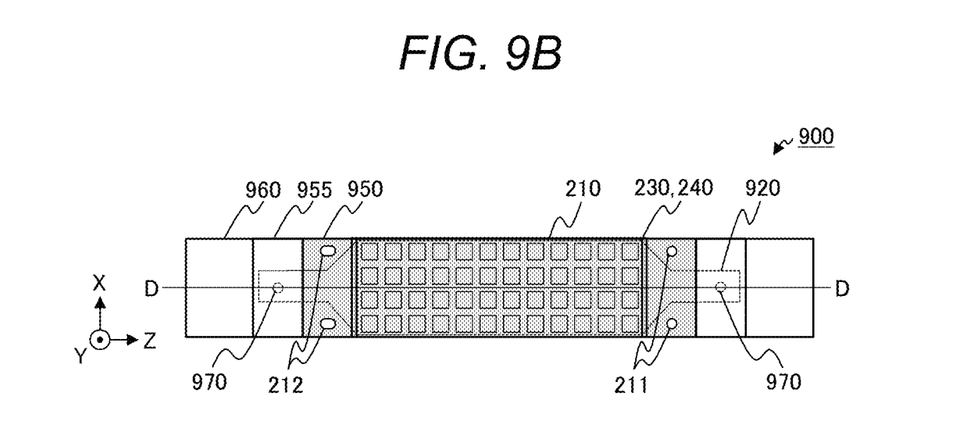
Figure 9C:
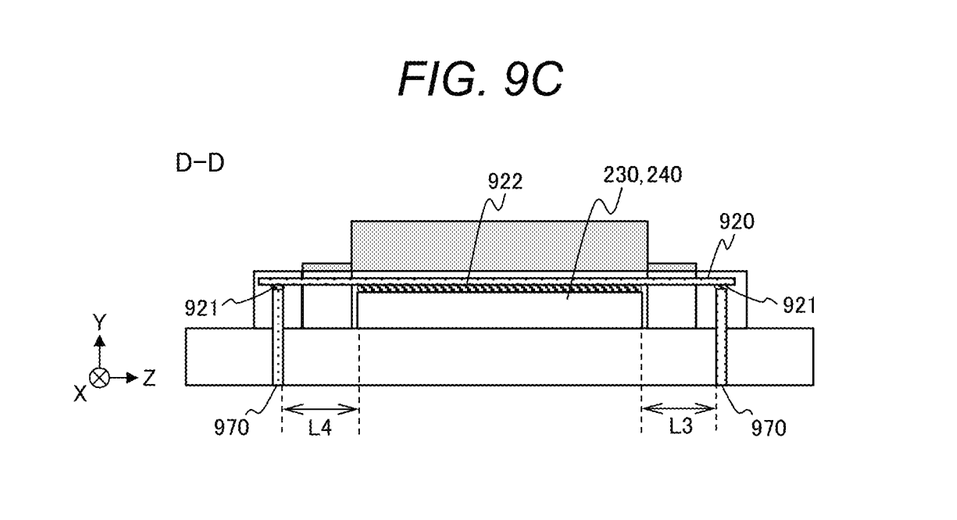

Now referring to FIGS. 9A to 9C, a detecting element module 900 according to the embodiment is described. FIG. 9A is a side view of the detecting element module 900. FIG. 9B is a top view of the detecting element module 900. FIG. 9C is a sectional view taken on the line D-D in FIG. 9B. The detecting element module 900 includes the collimator 210, a high voltage wire 920, the semiconductor layer 230, the photon counting circuit 240, a supporting column 950, a wire connection portion 955, and a base 960.

The base 960 is fixed to the rotary plate 5 as a support portion for supporting the X-ray source 1 and serves as a reference for the position of the detecting element module 900. The base 960 is formed of aluminum, for example. At the center of the base 960 with respect to the Z-direction, the photon counting circuit 240 and the semiconductor layer 230 are layered on top of each other in the Y-direction. A pair of supporting columns 950 is fixed on the base 960 at places within a predetermined distance from the semiconductor layer 230 with respect to the Z direction. The distance from the semiconductor layer 230 to the supporting column 250 is defined according to the dimension of the detecting element module 900 with respect to the Z-direction. Further, the wire connection portion 955 is disposed at place farther away from the semiconductor layer 230 than the supporting column 950 with respect to the Z-direction.

In order to supply the high voltage to the semiconductor layer 230, the high voltage wire 920 is laid on the X-ray incidence surface of the semiconductor layer 230, or on the side of the X-ray source 1. The high-voltage wire is formed of, for example, a flexible cable. A sheet-like conductor 922 is interposed between the high-voltage wire 920 and the semiconductor layer 230 so as to electrically interconnect these elements. Connection conductors 921 are disposed at opposite ends of the high-voltage wire 920 with respect to the Z-direction. The high-voltage wire 920 is supplied with several milliamperes of current via the connection conductors 921. In order not to interfere with the flow of current supplied to the high-voltage wire 920, the high-voltage wire 920 may desirably be configured to be progressively increased in the X-direction width from the connection conductor 921 to the sheet-like conductor 922, as shown in FIG. 9B.

The supporting column 950 is formed of a metal having high X-ray shielding effect such as copper, iron, brass and tungsten, and supports the collimator 210. In a case where a metal is used for the supporting column 950, the electric insulation between the supporting column 950 and the high-voltage wire 920 is ensured by a coating material of the high-voltage wire 920 or the like. To fix the collimator 210 to the supporting column 950, the mounting holes 211 and the mounting holes 212 disposed at opposite ends of the collimator 210 with respect to the Z-direction are used. As in the first embodiment, the supporting column 950 is formed with the cutout portion such that the high-voltage wire 920 is extended through the cutout portion to the wire connection portion 955.

The wire connection portion 955 is formed of an insulating material such as ceramics and contains therein a high-voltage supply portion 970. The high-voltage supply portion 970 is connected to the connection conductor 921 of the high-voltage wire 920 so as to supply the high voltage to the high-voltage wire 920. Distances L3, L4 between the semiconductor layer 230 and the high-voltage supply portion 970 in the wire connection portion 955, as shown in FIG. 9C, are so defined as to obviate the occurrence of electric discharge between the electrode of the photon counting circuit 240 of the semiconductor layer 230 and the high-voltage supply portion 970.

It is desirable to retain the high-voltage wire 920 substantially in horizontal position such that the high-voltage wire 920 may apply less tension to the semiconductor layer 230. As shown in FIG. 9C, therefore, the X-ray incidence surface of the semiconductor layer 230, the bottom of the cutout portion of the supporting column 950, and the high-voltage supply portion 970 of the wire connection portion 955 may desirably be equal in height. However, the tension applied to the semiconductor layer 230 by the high-voltage wire 920 may be so reduced as to obviate the breakage of the semiconductor layer 230. Hence, the heights of the above elements may also be defined based on the dimensions of the semiconductor layer 230 and the photon counting circuit 240, the strength which the semiconductor layer 230 can withstand before breakage, and the tension applied by the high-voltage wire 920. That is, the high-voltage wire 920 need not necessarily be horizontally laid. What is needed is to define the height of the bottom of the cutout portion of the supporting column 950 and the height of the high-voltage supply portion 970 of the wire connection portion 955 in a manner to obviate the breakage of the semiconductor layer 230.

In order to downsize the detecting element module 900, the embodiment is configured such that the supporting column 950 for supporting the collimator 210 is disposed at place within a predetermined distance from the semiconductor layer 230. Further, the high-voltage supply portion 970 for supplying the high voltage to the high-voltage wire 920 connected to the semiconductor layer 230 is disposed at such a distance from the semiconductor layer 230 as not to induce electric discharge between itself and the semiconductor layer 230. Thus, the embodiment is adapted to achieve the downsizing of the photon counting radiation detector including the semiconductor layer for detecting the photons of radiation and the collimator for suppressing the incidence of scattered rays as well as to ensure the high voltage resistance. Particularly, even in the case of a high value of the voltage supplied to the high-voltage wire 220, the embodiment can ensure the high voltage resistance while reducing the size of the collimator 210 in the Z-direction.

Figure 10A:
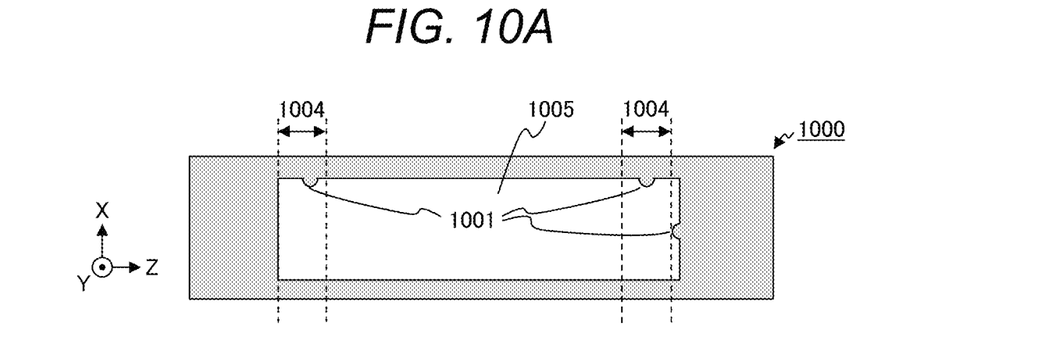
FIGS. 10A and 10B are diagrams showing an exemplary assembly jig for the detecting element module according to the third embodiment hereof.
Figure 10B:
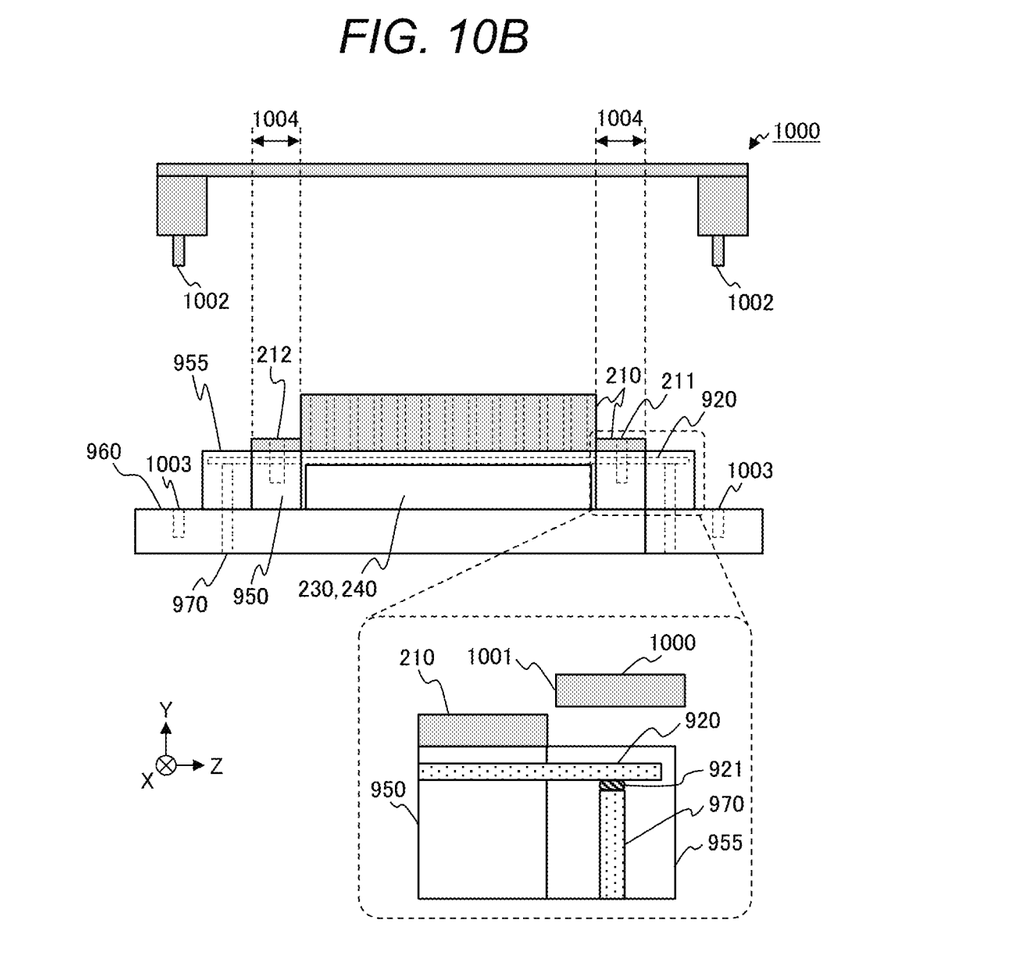

Now referring to FIGS. 10A and 10B, description is made on an assembly jig 1000 used for positioning of the collimator 210 when the detecting element module 900 of the embodiment is assembled. FIG. 10A is a top view of the assembly jig 1000. FIG. 10B is a set of side view of the assembly jig 1000 and a side view with enlarged view of the detecting element module 900.

The assembly jig 1000 includes protrusions 1001, pins 1002 and an aperture 1005. The pin 1002 is connected to a fixing hole 1003 used when the base 960 is fixed to the rotary plate 5. The positioning accuracy with which the base 960 of the detecting element module 900 is fixed to the rotary plate 5 is also reproduced between the rotary plate 5 and the assembly jig 1000 by connecting the pin 1002 to the fixing hole 1003.

The aperture 1005 is a rectangular opening larger than the collimator 210 with respect to an X-Z plane. One of the short sides of an inner periphery of the aperture 1005 is formed with one protrusion 1001 while one of the long sides thereof is formed with two protrusions 1001. A relative position between each apex of the three protrusions 1001 and the pin 1002 is so adjusted as to ensure the positioning accuracy between the base 960 and the collimator 210 when the collimator 210 is abutted against the three protrusions 1001 in the state where the pins 1002 are connected to the fixing holes 1003.

It is noted that the protrusion 1001 formed at the short side of the aperture 1005 is desirably located at the center of the aperture 1005 with respect to the X-direction. The protrusion 1001 formed at the long side of the aperture 1005 is desirably located in a supporting-column adjoining range 1004 as a range adjoining the supporting column 950. By forming the protrusions 1001 in the supporting-column adjoining range 1004, the assembly jig 1000 avoids contacting the semiconductor layer 230 or the photon counting circuit 240 during the assembly work of the collimator 210. It is noted that only the collimator 210 may be abutted against the protrusions 1001 of the assembly jig 1000 having the pins 1002 connected to the fixing holes 1003. Otherwise, the collimator 210 along with the supporting columns 950 may also be abutted against the protrusions. A Y-direction dimension of the wire connection portion 955 is so defined as to ensure that the protrusions 1001 of the assembly jig 1000 are abutted against the collimator 210. As shown in the enlarged view of FIG. 9B, for example, the Y-direction dimension of the wire connection portion 955 is the same as the Y-direction dimension of the supporting column 950.

The assembly jig 1000 according to the embodiment described with reference to FIGS. 10A and 10B permits the detecting element module 900 to be assembled while ensuring the positioning accuracy between the collimator 210 and the semiconductor layer 230.

Figure 11A:
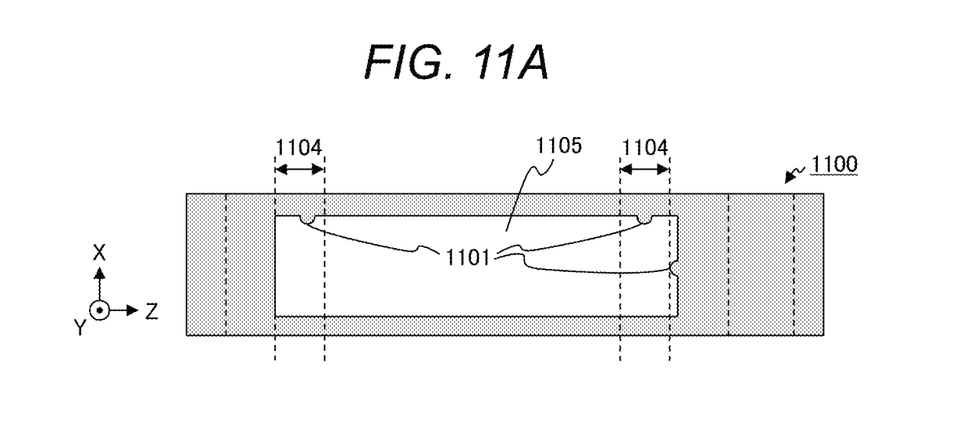
FIGS. 11A to 11C are diagrams showing a detecting element module according to a modification of the third embodiment hereof and an exemplary assembly jig therefor.
Figure 11B:
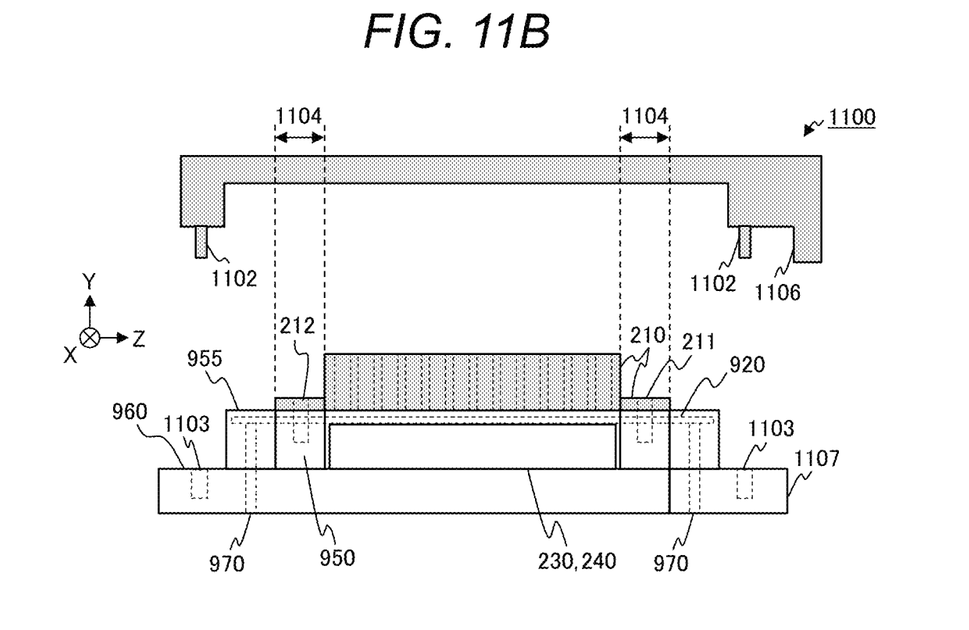
Figure 11C:
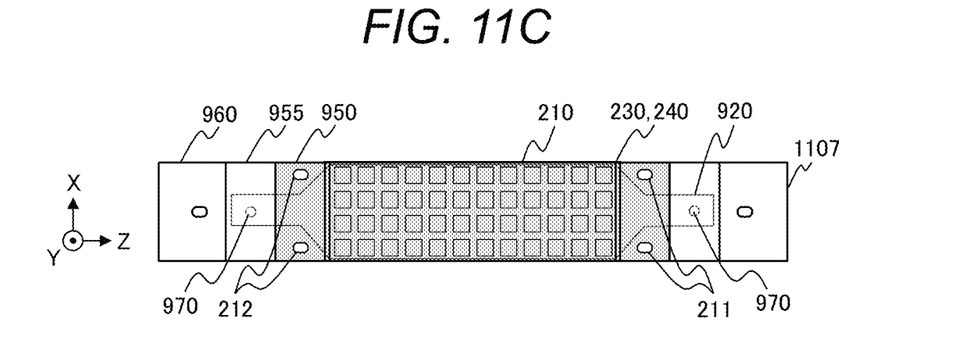

A modification of the embodiment is described with reference to FIGS. 11A to 11C. FIG. 11A is a top view of an assembly jig 1100. FIG. 11B is a side view of the assembly jig 1100 and the detecting element module. FIG. 11C is a top view of the detecting element module.

A detecting element module according to the embodiment differs from that of FIGS. 9A to 9C in that the mounting holes 211 for the collimator 210 and fixing holes 1103 used for fixing the base 960 of the detecting element module to the rotary plate 5 are elongate holes which have positioning freedom with respect to the Z-direction. A positioning reference used when fixing the base 960 to the rotary plate 5 is the fixing hole 1103 with respect to the X-direction and an abutment surface 1107 of the base 960 with respect to the Z-direction. The dispersed positioning references simplify the processing of the base 960.

The assembly jig 1100 includes protrusions 1101, pins 1102, an aperture 1105, and an abutment portion 1106. The pin 1102 is connected to a fixing hole 1103. The X-direction positioning accuracy with which the base 960 of the detecting element module is fixed to the rotary plate 5 is also reproduced between the rotary plate 5 and the assembly jig 1100 by connecting the pin 1102 to the fixing hole 1103. The abutment portion 1106 of the assembly jig 1100 is abutted against an abutment surface 1107 as the positioning reference for the base 960 with respect to the Z-direction. Positioning accuracy with which the base 960 is fixed to the rotary plate 5 is also reproduced between the rotary plate 5 and the assembly jig 1100 by abutting the abutment portion 1106 against the abutment surface 1107.

An aperture 1105 is a rectangular opening larger than the collimator 210 with respect to the X-Z plane. One of the short sides of an inner periphery of the aperture 1105 is formed with one protrusion 1101 while one of the long sides thereof is formed with two protrusions 1101. A relative position between each apex of the three protrusions 1001 and the pin 1102 is so adjusted as to ensure the positioning accuracy between the base 960 and the collimator 210 when the collimator 210 is abutted against the three protrusions 1101 in a state where the pins 1102 are connected to the fixing holes 1103.

It is noted that the protrusion 1101 formed at the short side of the aperture 1105 is desirably located at the center of the aperture 1105 with respect to the X-direction. The protrusion 1101 formed at the long side of the aperture 1105 is desirably located in a supporting-column adjoining range 1104 as a range adjoining the supporting column 950. By forming the protrusions 1101 in the supporting-column adjoining ranges 1104, the assembly jig 1100 is prevented from contacting the semiconductor layer 230 or the photon counting circuit 240 during the assembly of the collimator 210. It is noted that only the collimator 210 may be abutted against the protrusions 1101 of the assembly jig 1100 having the pins 1102 connected to the fixing holes 1103. Otherwise, the collimator 210 along with the supporting columns 950 may be abutted against the protrusions. A Y-direction dimension of the wire connection portion 955 is so defined as to ensure that the protrusions 1101 of the assembly jig 1100 are abutted against the collimator 210. As shown in FIG. 11B, for example, the Y-direction dimension of the wire connection portion 955 is the same as the Y-direction dimension of the supporting column 950.

The assembly jig 1100 according to the modification described with reference to FIGS. 11A to 11C permits the detecting element module of the modification to be assembled while ensuring the positioning accuracy between the collimator 210 and the semiconductor layer 230.

The plural embodiments of the radiation imaging system according to the present invention have been described. However, the radiation imaging systems according to the present invention are not limited to the above-described embodiments but can be practiced with some components thereof modified or changed within the spirit and scope of the invention. Further, a number of the components disclosed in the above-described embodiments can be combined as needed. Further, some of the all components disclosed in the above-described embodiments can be omitted.

REFERENCE SIGNS LIST

1: X-ray source, 2: X-ray detector, 3: signal processing unit, 4: image generating unit, 5: rotary plate, 6: bed, 7: object, 200: detecting element module, 210: collimator, 211: mounting hole, 212: mounting hole, 220: high-voltage wire, 221: connection conductor, 222: sheet-like conductor, 230: semiconductor layer, 240: photon counting circuit, 250: supporting column, 251: wire hole, 252: mounting hole, 253: cutout portion, 260: base, 261: wire hole, 262: mounting hole, 270: high-voltage supply portion, 500: airspace, 700: assembly jig, 701: protrusion, 702: pin, 703: fixing hole, 704: supporting-column adjoining range, 705: aperture, 800: detecting element module, 801: abutment end-face, 810: assembly jig, 811: abutment portion, 860: base, 900: detecting element module, 920: high-voltage wire, 921: connection conductor, 922: sheet-like conductor, 950: supporting column, 955: wire connection portion, 960: base, 970: high-voltage supply portion, 1000: assembly jig, 1001: protrusion, 1002: pin, 1003: fixing hole, 1004: supporting-column adjoining range, 1005: aperture, 1100: assembly jig, 1101: protrusion, 1102: pin, 1103: fixing hole, 1104: supporting-column adjoining range, 1105: aperture, 1106: abutment portion, 1107: abutment surface

What is claimed is:

1. A radiation imaging system comprising:
   a radiation source for radiation emission;
   a radiation detector for detecting photons of the radiation; and
   a support portion for supporting the radiation source and the radiation detector in opposed relation,
   wherein the radiation detector includes a plurality of detecting element modules arranged in an arcuate form,
   the detecting element module includes: a base fixed to the support portion; a semiconductor layer receiving the photons to output an electric charge; a high-voltage wire for supplying high voltage to the semiconductor layer; a collimator for suppressing scattered rays incident on the semiconductor layer; and a pair of supporting columns supporting the collimator and fixed to the base, and
   the supporting column is disposed at place within a predetermined distance from the semiconductor layer and includes a cutout portion in which the high-voltage wire is inserted.

2. The radiation imaging system according to claim 1,
   wherein an electrode surface connected to the high-voltage wire is disposed on the semiconductor layer on the radiation-source side thereof, and
   a difference in height from the base between a bottom of the cutout portion and the electrode surface is defined to be within a predetermined range.

3. The radiation imaging system according to claim 2, wherein the difference in height is defined to ensure that the high-voltage wire is retained in a horizontal position.

4. The radiation imaging system according to claim 1,
   wherein an electrode surface connected to the high-voltage wire is disposed on the semiconductor layer on the radiation-source side thereof, and
   the high-voltage wire is progressively increased in width from the opposite ends thereof toward the electrode surface with respect to a direction in which the detecting element modules are arranged.

5. The radiation imaging system according to claim 1, wherein the cutout portion is provided with a high-voltage supply portion for supplying high voltage to the high-voltage wire.

6. The radiation imaging system according to claim 1, wherein a high-voltage supply portion for supplying high voltage to the high-voltage wire is disposed at place farther from the semiconductor layer than the supporting column.

7. The radiation imaging system according to claim 6,
   wherein an electrode surface connected to the high-voltage wire is disposed on the semiconductor layer on the radiation-source side thereof, and
   the electrode surface, the cutout portion, and the high-voltage supply portion are each defined in height from the base in a manner that the high-voltage wire is retained in a horizontal position.

8. The radiation imaging system according to claim 1, wherein the collimator is positioned by means of an assembly jig mounted to the base.

9. The radiation imaging system according to claim 8,
   wherein the base is formed with holes used for fixing the base to the support portion, and
   the assembly jig includes pins fitted in the holes and protrusions abutted against two side surfaces of the collimator.

10. The radiation imaging system according to claim 9,
    wherein a high-voltage supply portion for supplying high voltage to the high-voltage wire is disposed at place farther from the semiconductor layer than the supporting column, and
    a height from the base to a top surface of the high-voltage supply portion is defined in a manner that the protrusions are abutted against the side surfaces of the collimator.

11. The radiation imaging system according to claim 8,
    wherein the assembly jig has an L-shaped cross-section, and
    the base includes an abutment end-face defined by an end-face against which an L-shaped structure is abutted.

* * * * *